US010850650B2

(12) United States Patent
Mori

(10) Patent No.: US 10,850,650 B2
(45) Date of Patent: Dec. 1, 2020

(54) VEHICLE SEAT

(71) Applicant: TOYOTA JIDOSHA KABUSHIKI KAISHA, Toyota (JP)

(72) Inventor: Kazuya Mori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 16/516,526

(22) Filed: Jul. 19, 2019

(65) Prior Publication Data

US 2020/0079252 A1 Mar. 12, 2020

(30) Foreign Application Priority Data

Sep. 12, 2018 (JP) ................................. 2018-170516

(51) Int. Cl.
*B60N 2/427* (2006.01)
*B60N 2/42* (2006.01)
(52) U.S. Cl.
CPC ......... *B60N 2/42736* (2013.01); *B60N 2/427* (2013.01); *B60N 2/4214* (2013.01)
(58) Field of Classification Search
USPC .................................................... 297/216.19
See application file for complete search history.

(56) References Cited

U.S. PATENT DOCUMENTS

| 4,026,572 A * | 5/1977 | Yoshioka | B24B 41/007 |
| | | | 280/276 |
| 6,257,663 B1 * | 7/2001 | Swierczewski | B60N 2/4214 |
| | | | 297/216.16 |
| 6,863,017 B2 * | 3/2005 | Charles | B60N 2/2839 |
| | | | 114/363 |
| D565,313 S * | 4/2008 | Johnsen | D6/349 |
| 8,100,471 B2 * | 1/2012 | Lawall | B60N 2/42763 |
| | | | 297/216.1 |
| 8,540,314 B2 * | 9/2013 | Fernandez | A47C 9/002 |
| | | | 297/314 |
| 8,926,012 B2 * | 1/2015 | Kaessner | B60N 2/4221 |
| | | | 297/216.2 |
| 9,737,745 B2 * | 8/2017 | Hugou | A47C 9/025 |
| 10,765,455 B2 * | 9/2020 | Jackson | A61B 17/8685 |

(Continued)

FOREIGN PATENT DOCUMENTS

| DE | 102006021439 A1 * | 2/2007 | ............ A47C 9/002 |
| JP | 2017-149331 A | 8/2017 | |

(Continued)

*Primary Examiner* — David E Allred
(74) *Attorney, Agent, or Firm* — Oliff PLC

(57) ABSTRACT

A vehicle seat 10 has a seat cushion 12, a seatback 14, a fixed supporting portion 24, and a movable supporting portion 26 that is supported by the fixed supporting portion 24 movably at least toward a seat rear side. Further, the vehicle seat 10 has an energy absorbing member 28 that, by being provided between the fixed supporting portion 24 and the movable supporting portion 26, restricts displacement of the movable supporting portion 26 with respect to the fixed supporting portion 24, and, due to the seatback 14 being pushed toward the seat rear side at a time of a collision of a vehicle, the energy absorbing member 28 is deformed and the movable supporting portion 26 is displaced with respect to the fixed supporting portion 24.

6 Claims, 4 Drawing Sheets

(56) References Cited

U.S. PATENT DOCUMENTS

| | | | | |
|---|---|---|---|---|
| 2003/0164633 A1* | 9/2003 | Jakus | ............... | A47C 9/002 |
| | | | | 297/271.5 |
| 2006/0220426 A1* | 10/2006 | Moffatt | ............... | B60N 2/4221 |
| | | | | 297/216.19 |
| 2013/0241253 A1* | 9/2013 | Harrison | ............... | A47C 7/14 |
| | | | | 297/258.1 |
| 2015/0151840 A1* | 6/2015 | Thomaschewski | .. | B60N 2/4242 |
| | | | | 297/216.19 |
| 2015/0272331 A1* | 10/2015 | Glockl | ............... | A47C 3/02 |
| | | | | 297/258.1 |

FOREIGN PATENT DOCUMENTS

| | | |
|---|---|---|
| JP | 2017-149351 A | 8/2017 |
| JP | 2017-210173 A | 11/2017 |
| JP | 2018-052347 A | 4/2018 |

* cited by examiner

VEHICLE SEAT

CROSS-REFERENCE TO RELATED APPLICATION

This application is based on and claims priority under 35 USC 119 from Japanese Patent Application No. 2018-170516 filed on Sep. 12, 2018, the disclosure of which is incorporated by reference herein.

BACKGROUND

Technical Field

The present disclosure relates a vehicle seat.

Related Art

Japanese Patent Application Laid-Open (JP-A) No. 2017-149331 (Patent Document 1) discloses a vehicle occupant protecting device that reduces the injury values of vehicle occupants who are seated in vehicle seats that are disposed so as to face one another in the vehicle front-rear direction.

In the vehicle occupant protecting device disclosed in the aforementioned document, at the time of a collision of the vehicle, by expanding a traversing airbag between vehicle seats that are disposed so as to face one another, the traversing airbag is interposed between the vehicle occupants who are seated in these vehicle seats. Due thereto, the knees of the vehicle occupants who are seated in these vehicle seats contacting one another is suppressed.

SUMMARY

It is thought that, at the time when a vehicle having a vehicle seat that faces toward the vehicle rear side is involved in a front collision, or at the time when a vehicle having a vehicle seat that faces toward the vehicle front side is involved in a rear collision, the impact to the vehicle occupant who is seated in the vehicle seat will increase. However, in the technique disclosed in aforementioned Patent Document 1, it is difficult to mitigate the impact to the vehicle occupant in such a case.

In view of the above-described circumstances, an object of the present invention is to provide a vehicle seat that can mitigate impact to a vehicle occupant seated in the vehicle seat at the time when a vehicle having the vehicle seat that faces toward the vehicle rear side is involved in a front collision, or at the time when a vehicle having the vehicle seat that faces toward the vehicle front side is involved in a rear collision.

A vehicle seat of a first aspect of the present invention includes: a seat cushion that supports a gluteal region of a vehicle occupant; a seatback that is mounted at a seat rear side end portion of the seat cushion, and that supports a back region of the vehicle occupant; a fixed supporting portion that is fixed to a floor of a vehicle body at a seat lower side of the seat cushion; a movable supporting portion that is fixed to the seat cushion, and is supported by the fixed supporting portion movably toward at least a seat rear side; and an energy absorbing member that, is provided between the fixed supporting portion and the movable supporting portion, thereby restricting displacement of the movable supporting portion with respect to the fixed supporting portion, and, as a result of the seatback being pushed toward the seat rear side at a time of a collision of a vehicle, the energy absorbing member being deformed and the movable supporting portion being displaced with respect to the fixed supporting portion.

In accordance with the vehicle seat of the first aspect, when the vehicle is involved in a front collision in a state in which the vehicle seat is facing toward the vehicle rear side, the back portion of the vehicle occupant seated in the vehicle seat pushes the seatback toward the seat rear side. Due thereto, the energy absorbing member is deformed, and the movable supporting portion is displaced toward the seat rear side with respect to the fixed supporting portion. As a result, the seat cushion and the seatback are displaced toward the seat rear side, and impact to the vehicle occupant seated in the vehicle seat is mitigated. Further, in a case in which the vehicle is involved in a rear collision in a state in which the vehicle seat is facing toward the vehicle front side, similarly, the seat cushion and the seatback are displaced toward the seat rear side. Due thereto, impact to the vehicle occupant seated in the vehicle seat is mitigated.

In a vehicle seat of a second aspect of the present invention, in the vehicle seat of the first aspect, the movable supporting portion is supported by the fixed supporting portion movably in all directions along a horizontal direction of the vehicle, and the energy absorbing member is provided around the movable supporting portion over an entire periphery in the horizontal direction along the vehicle.

In accordance with the vehicle seat of the second aspect, the movable supporting portion is supported by the fixed supporting portion movably in all directions of the horizontal direction of the vehicle. In addition, the energy absorbing member is provided around the movable supporting portion, over the entire periphery thereof in the horizontal direction along the vehicle. Therefore, the movable supporting portion can be displaced with respect to the fixed supporting portion in accordance with the direction in which the vehicle seat faces and the direction of the collision of the vehicle. As a result, the seat cushion and the seatback can be displaced in accordance with the direction in which the vehicle seat faces and the direction of the collision of the vehicle, and the impact to the vehicle occupant can be mitigated regardless of the direction in which the vehicle seat faces and the direction of the collision of the vehicle.

In a vehicle seat of a third aspect of the present invention, in the vehicle seat of the second aspect, a thickness dimension of the energy absorbing member in the horizontal direction of the vehicle differs at respective portions around the movable supporting portion.

In accordance with the vehicle seat of the third aspect, the movable supporting portion can be displaced with respect to the fixed supporting portion, in accordance with the thickness dimensions of the respective portions of the energy absorbing member. As a result, the seat cushion and the seatback can be displaced by a desired amount of displacement in accordance with the direction in which the vehicle seat faces and the direction of the collision of the vehicle.

In a vehicle seat of a fourth aspect of the present invention, in the vehicle seat of any one of the first through third aspects, the energy absorbing member is formed using a material that can be restored after being deformed between the fixed supporting portion and the movable supporting portion.

In accordance with the vehicle seat of the fourth aspect, the energy absorbing member is formed by using a material that can be restored. Due thereto, replacement of the energy absorbing member after a vehicle collision can be rendered unnecessary.

In a vehicle seat of a fifth aspect of the present invention, in the vehicle seat of any one of the first through fourth aspects, the movable supporting portion is supported by the fixed supporting portion tiltably in a seat front-rear direction.

In accordance with the vehicle seat of the fifth aspect, the movable supporting portion is supported at the fixed supporting portion so as to be able to tilt in the seat front-rear direction. Due thereto, the amount of displacement of the seat upper side portion of the seatback at the time of a vehicle collision can be made to be greater than the amounts of displacement of the seat lower side portion of the seatback and of the seat cushion. Due thereto, impact to the chest region and the head portion of the vehicle occupant who is seated in the vehicle seat can be reduced effectively.

In a vehicle seat of a sixth aspect of the present invention, in the vehicle seat of any one of the first through fifth aspects, the movable supporting portion has a spherical portion and a shaft portion that is formed so as to project out from the spherical portion, and a supporting hole, which has a larger diameter than an outer diameter of the spherical portion, is formed in the fixed supporting portion, and the spherical portion is accommodated in the supporting hole, and the shaft portion is disposed so as to project out from the supporting hole.

In accordance with the vehicle seat of the sixth aspect, the spherical portion that is accommodated in the supporting hole can be smoothly moved relatively within the supporting hole.

The vehicle seat relating to the present invention has the excellent effect of being able to mitigate impact to a vehicle occupant seated in the vehicle seat at the time when a vehicle having the vehicle seat that faces toward the vehicle rear side is involved in a front collision, or at the time that a vehicle having the vehicle seat that faces toward the vehicle front side is involved in a rear collision.

BRIEF DESCRIPTION OF THE DRAWINGS

Exemplary embodiments will be described in detail based on the following figures, wherein.

DETAILED DESCRIPTION

Figure 1:
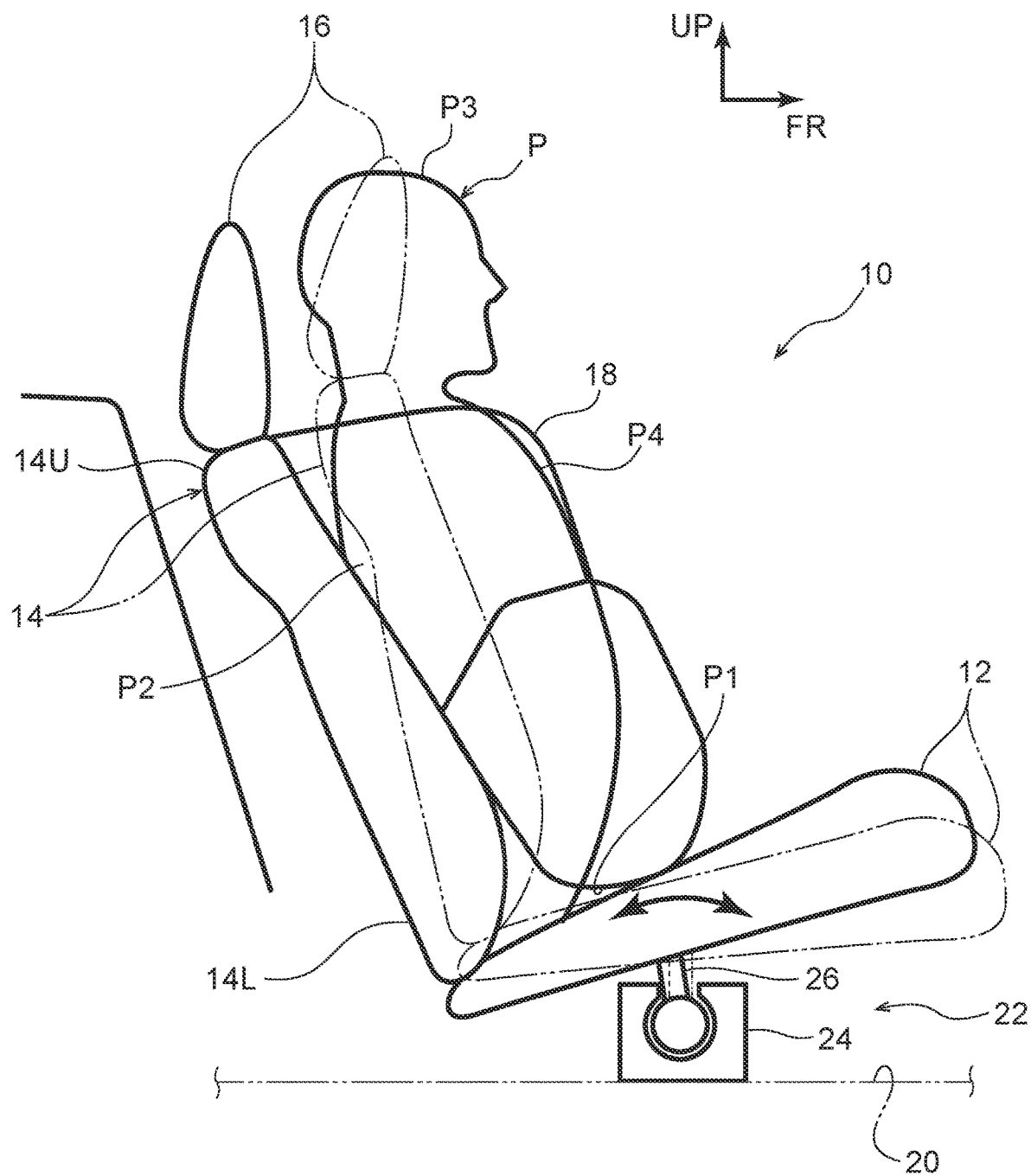
FIG. 1 is a side view showing a vehicle seat of a present embodiment.
Figure 2:
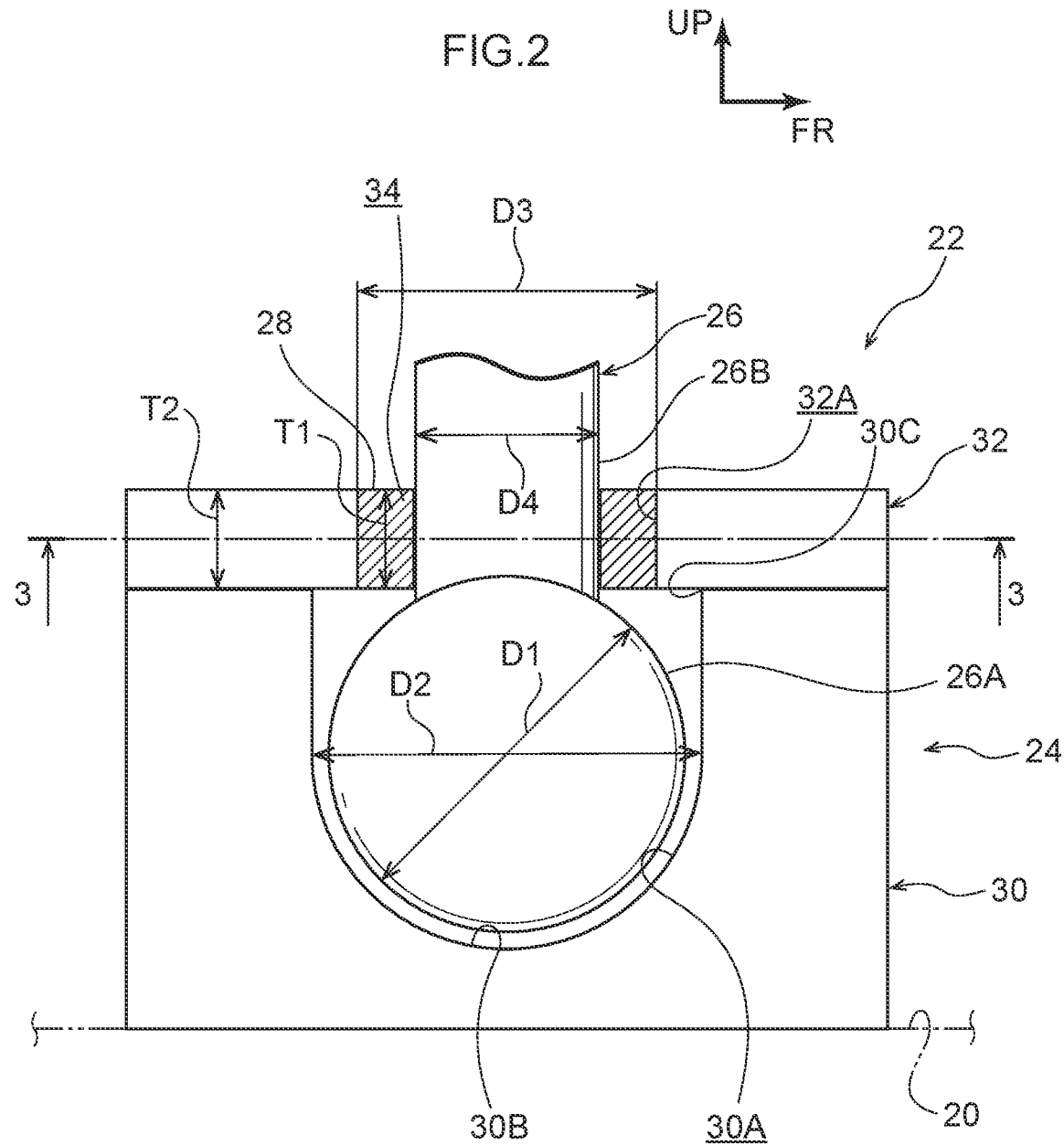
FIG. 2 is a partial sectional view showing a seat supporting device in an enlarged manner.
Figure 3:
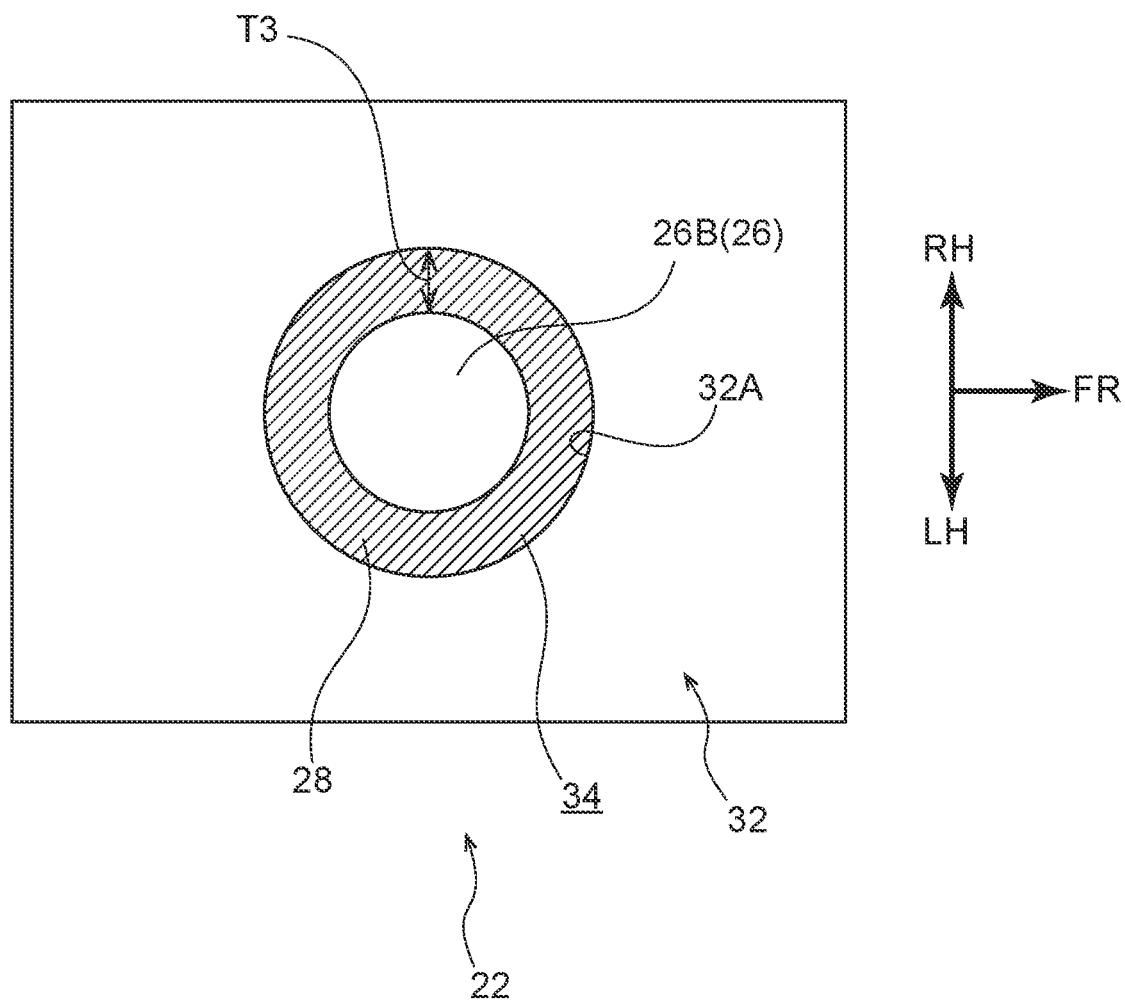
FIG. 3 is a cross-sectional view showing the seat supporting device that is cut along line 3-3 shown in FIG. 2.

A vehicle seat 10 relating to an embodiment of the present invention is described by using FIG. 1 through FIG. 3. Note that, when explanation is given hereinafter by using front-rear, left-right, and vertical directions, they refer to the front-rear, left-right, and vertical directions as seen from a vehicle occupant seated in the vehicle seat 10, unless otherwise specified. Further, arrow FR that is shown appropriately in the respective drawings indicates the seat frontward direction, arrow UP indicates the seat upward direction, arrow RH indicates the seat rightward direction, and arrow LH indicates the seat leftward direction. The left-right direction coincides with the seat width direction. Moreover, the seat front-rear direction and the seat width direction coincide with horizontal directions of the vehicle.

As shown in FIG. 1, the vehicle seat 10 of the present embodiment has a seat cushion 12 that supports buttocks (a gluteal region) P1 of a vehicle occupant P (a seated vehicle occupant), a seatback 14 that is mounted to the rear end portion of the seat cushion 12 and supports a back portion P2 of the vehicle occupant P, and a headrest 16 that is mounted to the upper end portion of the seatback 14 and supports a head portion P3 of the vehicle occupant P. Further, the vehicle seat 10 has a seatbelt device 18 (a three-point seatbelt device) that restrains the vehicle occupant P at the time of a collision of the vehicle. Moreover, the vehicle seat 10 has a seat supporting device 22 that fixes the vehicle seat 10 to a floor 20 of the vehicle body. Note that hatching of cross-sections is omitted from FIG. 1. Further, the structure of the seat supporting device 22 is illustrated in a simplified manner.

Here, the vehicle seat 10 of the present embodiment is provided within the cabin of a self-driving vehicle. Therefore, the seat front side of the vehicle seat 10 is fixed in a state of facing toward the rear side of the vehicle. Note that the vehicle seat 10 may be structured such that, due to the vehicle seat 10 being rotated, the seat front side of the vehicle seat 10 is made to face toward the front side of the vehicle.

The seat cushion 12 has a seat cushion frame that structures the frame of the seat cushion 12. This seat cushion frame is fixed to the floor 20 of the vehicle body via the seat supporting device 22 that is described later.

As shown in FIG. 2, the seat supporting device 22 has a fixed supporting portion 24 that is fixed to the floor 20 of the vehicle body at the seat lower side of the seat cushion 12 (see FIG. 1), a movable supporting portion 26 that is supported by the fixed supporting portion 24, and an energy absorbing member 28 that is provided between the fixed supporting portion 24 and the movable supporting portion 26. Note that hatching of cross-sections other than the energy absorbing member 28 is omitted from FIG. 2.

The fixed supporting portion 24 is structured to include a fixed supporting portion main body 30 that is formed in the shape of a block, and a cover 32 that is fixed to the upper surface of the fixed supporting portion main body 30.

A supporting hole 30A whose upper side is open is formed in the fixed supporting portion main body 30. A surface 30B at the lower side of this supporting hole 30A is formed in a spherical shape that has inner diameter D2 that corresponds to outer diameter D1 of a spherical portion 26A of the movable supporting portion 26 that is described later (the inner diameter D2 is slightly larger than the outer diameter D1). Due thereto, the spherical portion 26A of the movable supporting portion 26 is supported at the spherical surface of the lower side surface 30B of the supporting hole 30A. Note that the inner diameter of an open end 30C of the supporting hole 30A also is the inner diameter D2.

The cover 32 is formed in the shape of a rectangular plate whose thickness direction is the vertical direction. As shown in FIG. 2 and FIG. 3, a through-hole 32A, through which a shaft portion 26B of the movable supporting portion 26 that is described later passes, is formed in the cover 32. As seen from the upper side, the edge of this through-hole 32A is formed in a circular shape, and inner diameter D3 of the through-hole 32A is set to an inner diameter that is larger than outer diameter D4 of the shaft portion 26B and is smaller than the outer diameter D1 of the spherical portion 26A. Note that, in FIG. 3, hatching of cross-sections other than the energy absorbing member 28 is omitted.

As shown in FIG. 2, the movable supporting portion 26 has the spherical portion 26A that is formed in the shape of a sphere, and the shaft portion 26B that is formed integrally with the spherical portion 26A and that is formed in a solid cylindrical shape. In the state in which the movable supporting portion 26 is supported by the fixed supporting portion 24 (the state in which the spherical portion 26A is disposed within the supporting hole 30A of the fixed supporting portion main body 30, and the cover 32 is fixed to the fixed supporting portion main body 30), the shaft portion 26B passes through the through-hole 32A of the cover 32, and projects out toward the upper side. Further, by setting the inner diameter D3 of the through-hole 32A to be larger than the outer diameter D4 of the shaft portion 26B, the shaft portion 26B can move in all orientations in the horizontal direction of the vehicle, with respect to the fixed supporting portion 24. Further, the upper end portion of the shaft portion 26B is fixed to the seat cushion frame of the seat cushion 12 (see FIG. 1).

As shown in FIG. 2 and FIG. 3, the energy absorbing member 28 is formed by using rubber that is a material that is restorable after deformation. This energy absorbing member 28 is provided so as to fill in a gap 34 that is formed between the through-hole 32A, which is formed in the cover 32 of the fixed supporting portion 24, and the shaft portion 26B of the movable supporting portion 26. Here, in the present embodiment, thickness T1 of the energy absorbing member 28 in the vertical direction is set to be approximately the same dimension as thickness T2 of the cover 32. Further, as shown in FIG. 3, thickness dimension T3 of the energy absorbing member 28 in the horizontal direction of the vehicle is the same dimension at the respective portions around the shaft portion 26B of the movable supporting portion 26.

By providing this energy absorbing member 28, at usual times of the vehicle (i.e., in a state in which acceleration that accompanies a collision is not being applied to the vehicle), tilting of the shaft portion 26B of the movable supporting portion 26 is restricted by the energy absorbing member 28, and the seat cushion 12 and the seatback 14 are maintained in the usual state that is shown by the two-dot chain lines in FIG. 1.

Operation and Effects of Present Embodiment

Operation and effects of the present embodiment are described next.

As shown in FIG. 1, when the vehicle, which is equipped with the vehicle seat 10 of the present embodiment that is facing toward the rear side of the vehicle, is involved in a front collision, the vehicle occupant P who is seated in the vehicle seat 10 inertially moves toward the seat rear side (the vehicle front side). Due thereto, the back portion P2 of the vehicle occupant P seated in the vehicle seat 10 pushes the seatback 14 toward the seat rear side. Due thereto, the seat rear side of the energy absorbing member 28 (see FIG. 2 and FIG. 3) is deformed between the shaft portion 26B of the movable supporting portion 26 and the cover 32 of the fixed supporting portion 24, and the movable supporting portion 26 tilts toward the seat rear side with respect to the fixed supporting portion 24. As a result, the seat cushion 12 and the seatback 14 are tilted toward the seat rear side, and the impact to the vehicle occupant P who is seated in the vehicle seat 10 can be mitigated.

Further, similarly, in a case in which a vehicle, which is equipped with the vehicle seat 10 of the present embodiment that is facing toward the front side of the vehicle, is involved in a rear collision, the seat cushion 12 and the seatback 14 are tilted toward the seat rear side. Due thereto, the impact to the vehicle occupant P who is seated in the vehicle seat 10 can be mitigated.

As shown in FIG. 2 and FIG. 3, in the present embodiment, the movable supporting portion 26 is supported at the fixed supporting portion 24 so as to be able to be displaced in all directions in the horizontal direction of the vehicle. In addition, the energy absorbing member 28 is provided around the shaft portion 26B of the movable supporting portion 26, over the entire periphery thereof in the horizontal direction of the vehicle. Therefore, the movable supporting portion 26 can be made to tilt with respect to the fixed supporting portion 24 in accordance with the direction in which the vehicle seat 10 faces and in accordance with the direction of the collision of the vehicle. As a result, the seat cushion 12 and the seatback 14 can be displaced in accordance with the direction in which the vehicle seat 10 faces and the direction of the collision of the vehicle, and impact to the vehicle occupant P can be mitigated regardless of the direction in which the vehicle seat 10 faces and the direction of the collision of the vehicle.

Further, in the present embodiment, the energy absorbing member 28 that deforms due to a collision of the vehicle is restored after the vehicle collision. Due thereto, the need to replace the energy absorbing member 28 after a vehicle collision can be rendered unnecessary. As a result, an increase in the repair costs of the vehicle after a collision can be suppressed.

Moreover, in the present embodiment, the movable supporting portion 26 is tiltably supported at the fixed supporting portion 24. Due thereto, as shown in FIG. 1, the amount of displacement of a portion 14U at the seat upper side of the seatback 14 at the time of a vehicle collision can be made to be larger than the amounts of displacement of a portion 14L at the seat lower side of the seatback 14 and of the seat cushion 12. Due thereto, impact to a chest region P4 and the head portion P3 of the vehicle occupant P who is seated in the vehicle seat 10 can be effectively reduced.

Note that the present embodiment describes an example in which the movable supporting portion 26 is tiltably supported by the fixed supporting portion 24. However, the present invention is not limited to this. For example, there may be a structure in which the movable supporting portion is supported by the fixed supporting portion so as to be able to slidingly move at least toward the seat rear side, and the energy absorbing member is provided between this movable supporting portion and the fixed supporting portion.

Further, although the present embodiment describes an example that is structured such that the energy absorbing member 28, which deforms due to a vehicle collision, is restored after the vehicle collision (the energy absorbing member 28 is formed of rubber), the present invention is not limited to this. For example, the energy absorbing member may be formed by ribs or a honeycomb structural body or the like that is formed of hard urethane, foamed polypropylene or resin that cannot be restored (plastically deforms) after a collision.

Figure 4:
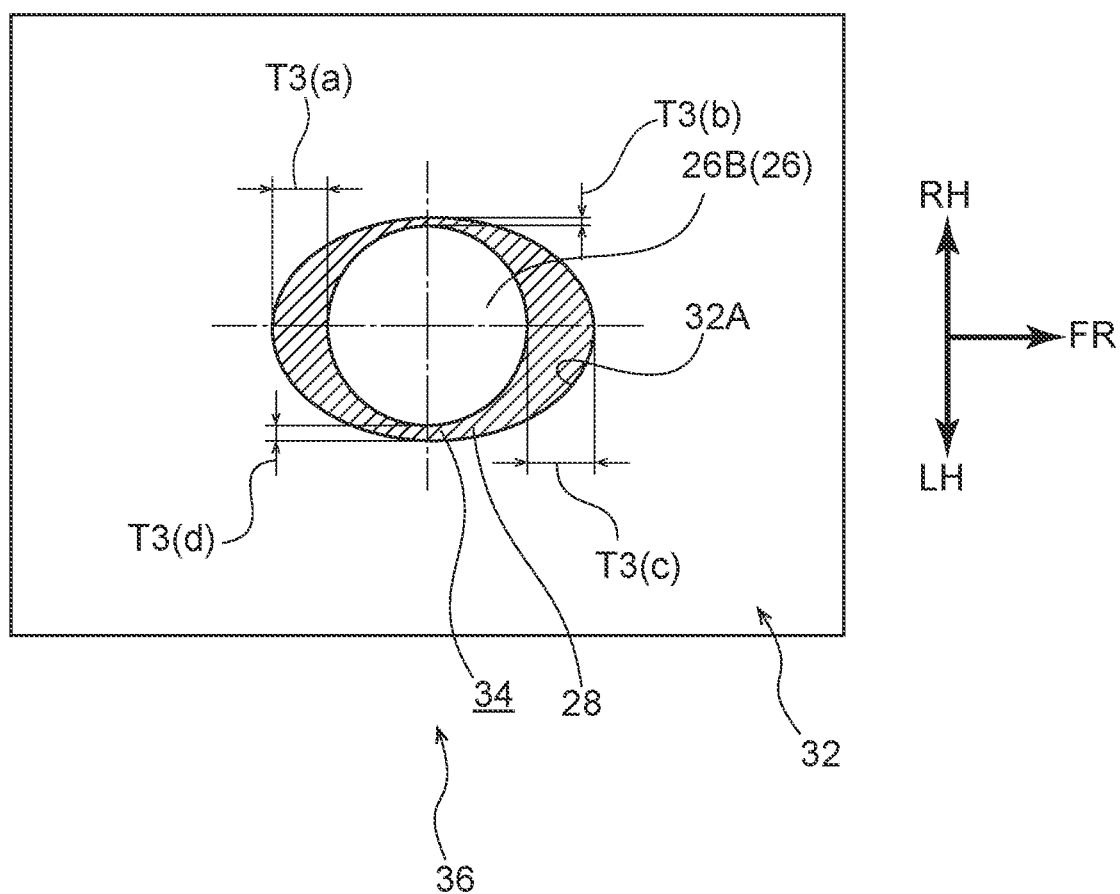
FIG. 4 is a cross-sectional view that corresponds to FIG. 3 and shows a seat supporting device of another form.

Moreover, as shown in FIG. 3, the present embodiment describes an example in which the thickness dimension T3 of the energy absorbing member 28 in the horizontal direction of the vehicle is set to be a dimension that is the same at the respective portions around the shaft portion 26B of the movable supporting portion 26. However, the present invention is not limited to this. For example, as in a seat supporting device 36 that is shown in FIG. 4, the shape of the through-hole 32A that is formed in the cover 32 may be formed in an oval shape whose length direction is the seat front-rear direction, and the thickness dimension T3 of the energy absorbing member 28 in the horizontal directions of the vehicle may be set to be dimensions that differ at the respective portions around the shaft portion 26B of the movable supporting portion 26. Note that, in FIG. 4, hatching of cross-sections other than the energy absorbing member 28 is omitted. As an example, in the seat supporting device 36 shown in FIG. 4, thickness dimension T3(*b*) in the left-right direction from the right side end of the shaft portion 26B of the movable supporting portion 26 to the edge of the through-hole 32A is set to be a dimension that is thinner than thickness dimension T3(*d*) in the left-right direction from the left side end of the shaft portion 26B of the movable supporting portion 26 to the edge of the through-hole 32A. Further, thickness dimension T3(*c*) in the front-rear direction from the front side end of the shaft portion 26B of the movable supporting portion 26 to the edge of the through-hole 32A is set to a dimension that is thicker than thickness dimension T3(*a*) in the front-rear direction from the rear side end of the shaft portion 26B of the movable supporting portion 26 to the edge of the through-hole 32A. By setting the thicknesses of the respective portions of the energy absorbing member 28 to be dimensions that differ from one another in this way, the seat cushion 12 and the seatback 14 can be displaced by a desired amount of displacement in accordance with the direction in which the vehicle seat 10 faces and in accordance with the direction of the collision of the vehicle.

Although embodiments of the present invention have been described above, the present invention is not limited to the above, and can, of course, be implemented by being modified in various ways other than the above within a scope that does not depart from the gist thereof.

What is claimed is:

1. A vehicle seat, comprising:
   a seat cushion that supports a gluteal region of a vehicle occupant;
   a seatback that is mounted at a seat rear side end portion of the seat cushion, and that supports a back region of the vehicle occupant;
   a fixed supporting portion that is fixed to a floor of a vehicle body at a seat lower side of the seat cushion;
   a movable supporting portion that is fixed to the seat cushion and is movably supported by the fixed supporting portion movably; and
   an energy absorbing member that is provided between the fixed supporting portion and the movable supporting portion, thereby restricting displacement of the movable supporting portion with respect to the fixed supporting portion, and, as a result of the seatback being pushed toward the seat rear side at a time of a collision of a vehicle, the energy absorbing member being deformed and the movable supporting portion being displaced with respect to the fixed supporting portion, wherein
   the energy absorbing member comprises an elliptical ring having a varying thickness dimension along a circumference of the elliptical ring, including a greater thickness at each of a front portion and a rear portion of the elliptical ring than at side portions of the elliptical ring, such that lateral movement of a portion of the movable supporting portion disposed inside the elliptical ring is resisted to a greater degree than fore and aft movement.

2. The vehicle seat of claim 1, wherein:
   the movable supporting portion is supported by the fixed supporting portion movably in all directions along a horizontal direction of the vehicle, and
   the energy absorbing member is provided around the movable supporting portion along an entire periphery of the elliptical ring in the horizontal direction of the vehicle.

3. The vehicle seat of claim 2, wherein the thickness dimension of the elliptical ring in the horizontal direction of the vehicle differs at respective portions around the movable supporting portion.

4. The vehicle seat of claim 1, wherein the energy absorbing member is formed using a material that can be restored after being deformed between the fixed supporting portion and the movable supporting portion.

5. The vehicle seat of claim 1, wherein the movable supporting portion is supported by the fixed supporting portion tiltably in a seat front-rear direction.

6. The vehicle seat of claim 1, wherein:
   the movable supporting portion has a spherical portion and a shaft portion that is formed so as to project outward from the spherical portion,
   a supporting hole, which has a larger diameter than an outer diameter of the spherical portion, is formed in the fixed supporting portion, and
   the spherical portion is accommodated in the supporting hole and the shaft portion is disposed so as to project outward from the supporting hole.

* * * * *